Oct. 18, 1960

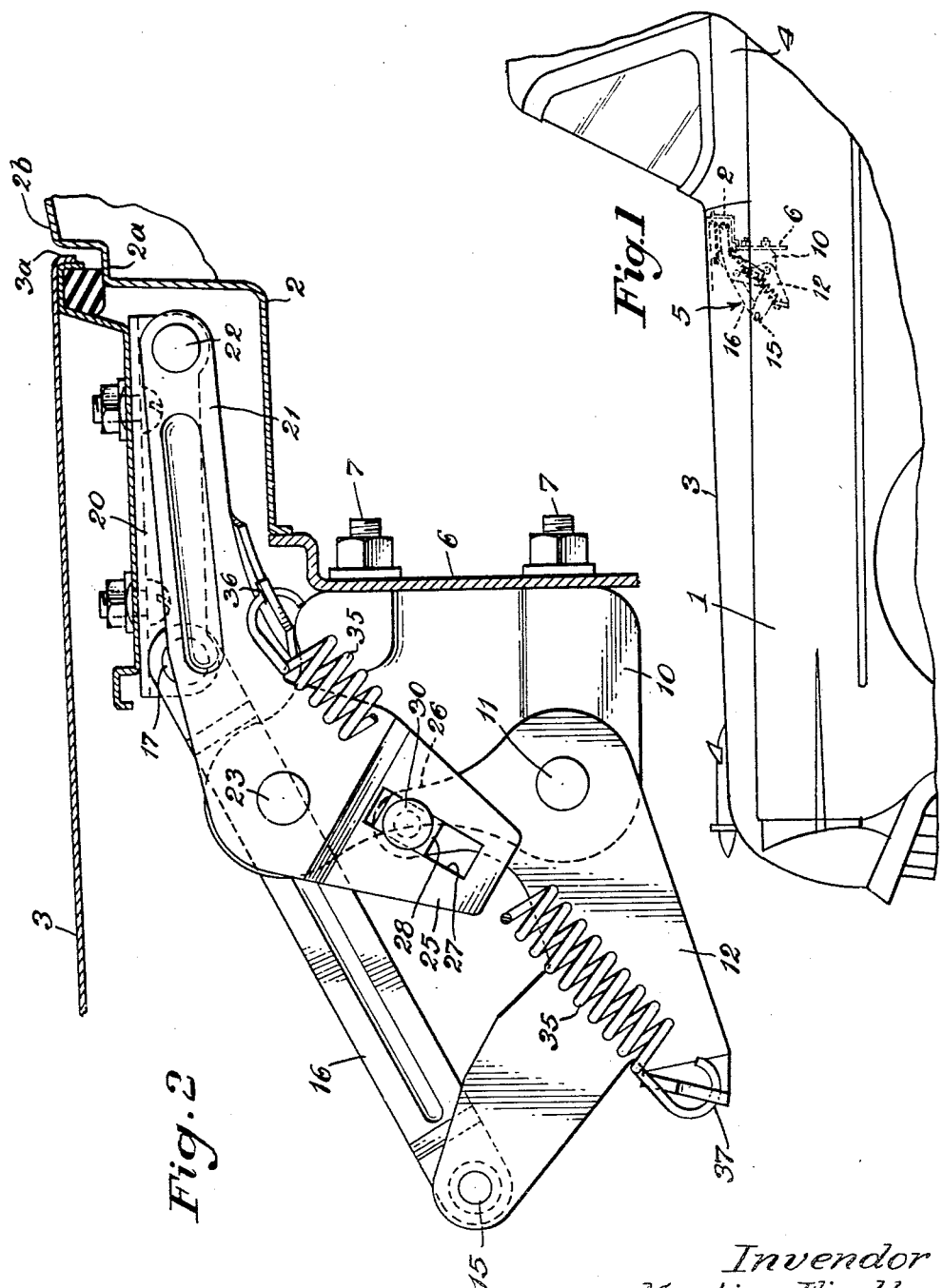

M. FIEDLER 2,956,303

ARTICULATED HINGE

Filed Dec. 7, 1956

Inventor
Martin Fiedler by Parker & Carter
Attorneys

Oct. 18, 1960 M. FIEDLER 2,956,303
ARTICULATED HINGE
Filed Dec. 7, 1956 4 Sheets-Sheet 3

Inventor
Martin Fiedler by Parker & Carter
Attorneys

Oct. 18, 1960   M. FIEDLER   2,956,303
ARTICULATED HINGE
Filed Dec. 7, 1956   4 Sheets-Sheet 4

Inventor
Martin Fiedler by Parker & Carter
Attorneys

United States Patent Office 2,956,303
Patented Oct. 18, 1960

2,956,303

ARTICULATED HINGE

Martin Fiedler, Chicago, Ill., assignor to Chicago Forging and Manufacturing Company, Chicago, Ill., a corporation of Delaware Filed Dec. 7, 1956, Ser. No. 627,077

1 Claim. (Cl. 16—128.1)

This invention relates to an improvement in hinge or connection means for automobile hood closures and the like and has for one purpose the provision of a connection effective to provide controlled movement of the closure in relation to the hood.

Another purpose is to provide a hinge connection between automobile hoods and closures and the like which shall be effective to hold the closure in desired closed or open position.

Another purpose is to provide hinge means for automobile hood closures and the like effective to cause relative movement therebetween without binding contact of the closure with the hood.

Another purpose is to provide hinge means for hood closures and the like which shall be effective to provide means limiting the movement of the closure away from the hood.

Another purpose is to provide movable supporting connections between an automobile hood closure and the vehicle which shall provide a minimum of friction and which shall necessitate the employment of minimum force in raising and lowering the hood closure.

Another purpose is to provide improved movable supporting connections between a hood closure and vehicle which shall be effective to control the path of the movement of the closure when it is moving between open and closed positions.

Another purpose is to provide an articulated hinge structure incorporating its own limit means.

Another purpose is to provide a hinge structure incorporating a number of relatively movable elements for incorporating a particular means for movably joining at least some of said elements.

Another purpose is to provide a hinge structure for automobile hood closures effective to produce simultaneous raising and tilting of an automobile hood about a continuous moving axis.

Another purpose is to provide a hinge structure for automobile hood closures and the like having a minimum number of parts and occupying a minimum amount of space.

Another purpose is to provide a hinge structure for automobile hood closures and the like capable of accomplishing the above described purposes while at the same time incorporating a maximum of simplicity and reliability.

Other purposes will appear from time to time throughout the specification and claim.

The present application is a continuation-in-part of my pending application Serial No. 596,269, filed July 6, 1956, and now abandoned.

The invention is illustrated more or less diagrammatically in the accompanying drawings wherein—

Figure 1 is a side elevation of the forward part of a vehicle when a closure is in closed position, with enclosed parts indicated in dotted lines;

Figure 2 is a side elevation illustrating on a larger scale the hinge means shown in dotted lines in Figure 1, with the parts in closed position;

Like parts are indicated by like numerals throughout the specification and drawings.

Figure 4:
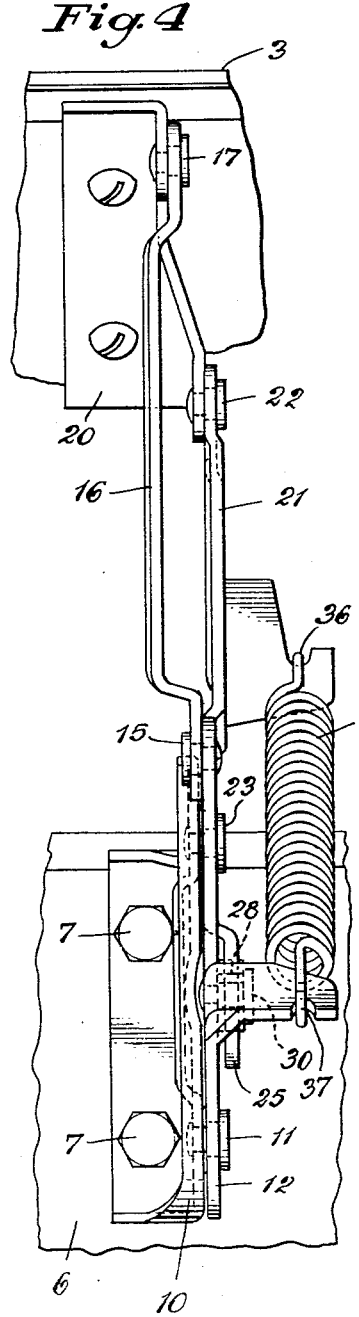
Figure 4 is an end view of the structure illustrated in Figure 3.

Referring now to the drawings and particularly to Figure 1, the numeral 1 generally illustrates the hood of the vehicle. A vehicle cowl is indicated at 2. A closure for the hood 1 is indicated by the numeral 3. The vehicle body proper is generally indicated by the numeral 4. The hinge means of the invention is shown in dotted lines of Figure 1 and is indicated generally in Figure 1 by the numeral 5.

Referring now particularly to Figure 2, the cowl 2 may have a generally vertical depending fire-wall section 6. Secured, as by the connectors 7, to the fire-wall 6 is a mounting or support plate 10. Pivotally mounted, as at 11 to the mounting plate 10 is a first lever member or link 12. Pivotally connected to the link 12 as at 15 is a second hinge lever or arm 16. The hinge link 16 is pivotally connected at its opposite end, as at 17 to a bracket element 20.

The bracket element 20 pivotally mounts a third hinge arm or link 21, the pivotal mounting of the member 21 being spaced on the bracket 20 from the pivot 17 as indicated at 22. The member 21 is pivotally connected adjacent its opposite end, as at 23, to the mounting plate 10, the pivots 11, 23 on the mounting plate 10 being spaced thereon as clearly shown in Figures 2 and 3. The member 21 has an end portion 25 extending radially from the pivot 23. Similarly, the member 12 has a portion 26 projecting radially from the pivot 11 and adjacent thereto.

The lever portion 25 has formed therein a slot or opening 27 which may extend in a path paralleling a line directed radially from the pivot. Slidably positioned within the slot 27 is a shoe or block 28 engaging opposite side edge walls of the slot 27. The member 28 is pivotally or rotatably mounted on the projection 26 and is held in position in the slot 27 by a cap 30 which is in turn secured to the portion 26.

As may be seen from the drawings herein, as the hinge structure of my invention moves toward and away from either closed or open position, the member 28 rotates in relation to the lever or arm 12 and simultaneously slides with relation to the arm 21. When the hinge is moved toward open position, the member 28 initially moves upwardly in the opening 27, as the parts are shown in the drawings and, as the portions 25, 26 pass over center, the member 28 moves downwardly. As the member 28 reaches one end of the opening 27 or the bottom end, as the parts are shown in the drawings, it limits the hinge structure of my invention against further movement and thus constitutes a stop means for the fully-open position of the hinge structure of my invention and of the closure against which it is attached. Since the member 28 and opening 27 are in continuous engagement and since the member 28 is free to pivot in relation to the portion 26 and slide in relation to the portion 27, at all positions of my hinge structure, it will be clear that no opportunity exists for binding of the parts or for maladjustment.

Figure 3:
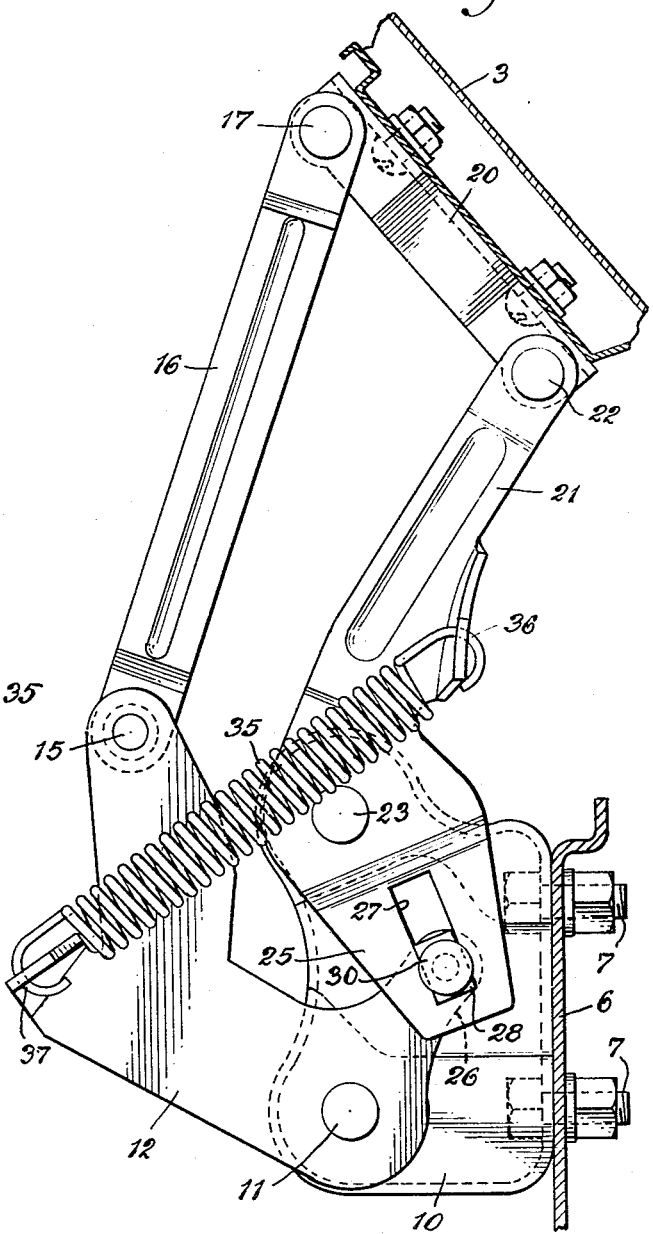
Figure 3 is a view similar to that of Figure 2 with the parts shown in open position.

Yielding means, such as the spring 35 illustrated in Figures 2, 3, and 4, may connect the members 12, and 21, the point of connection 36 of one end of the spring 35 to the member 21 being positioned thereon at a point intermediate the pivots 22, 23 and the point of connection 37 of the opposite end of the spring 35 to the member 12 being positioned thereon at a point intermediate the pivots 11, 15, the purpose of which will appear hereinbelow.

The bracket or mounting plate 20 carries the closure member 3 and is connected thereto adjacent the rear edge 3a of the closure 3.

While there is shown and described herein a single hinge structure 5, it will be realized that the hood closure 3 and hood 1 may be connected by a pair of such structures, one of such structures being positioned adjacent the opposite rear corners of the closure 3. Since the hinge structures, in such event are identical, only the single hinge structure, for convenience, is described.

As best seen in Figure 2, the closure rear edge 3a overlaps an underlying portion 2a of the cowl 2. Similarly, it is common practice to provide an upper visible cowl surface 2b lying in the plane of the closure 3 when the closure is in closed position and a minimum spacing is desired between the rear edge 3a of the closure 3 and the cowl portion 2b. Under these circumstances, when the cowl is raised from the forward portion of the vehicle, it is possible to cause a binding between the rear edge 3a of the closure 3 and the cowl 2 and a consequent distortion of the closure edge 3a. It is therefore one purpose of this invention to provide a hinge structure which, when the cowl is raised from the forward portion thereof, is effective to produce a substantially vertical rise of the closure 3 to separate the edge 3a from the cowl 2 a distance sufficient to permit tilting of the closure 3 without bringing the edge 3a into binding contact with the cowl 2. It will be realized that the rising and tilting action of the closure may be substantially simultaneous without departing from the nature and scope of my invention.

Thus the pivot points 23, 11 are arranged, the former substantially above the latter, on the mounting plate 10 beneath the closure 3. When the closure is in closed position, the member 21 extends from a point substantially rearwardly of the mounting plate 10 to a point slightly forward of the pivot 23. Similarly, the member 12 extends from the pivot 11 forwardly a substantial distance from the plate 10. The member 16 joins the forward end of the member 12 pivotally with the closure mounting bracket 20 and in doing so passes substantially through the plane of the pivot point 23.

Figure 5:
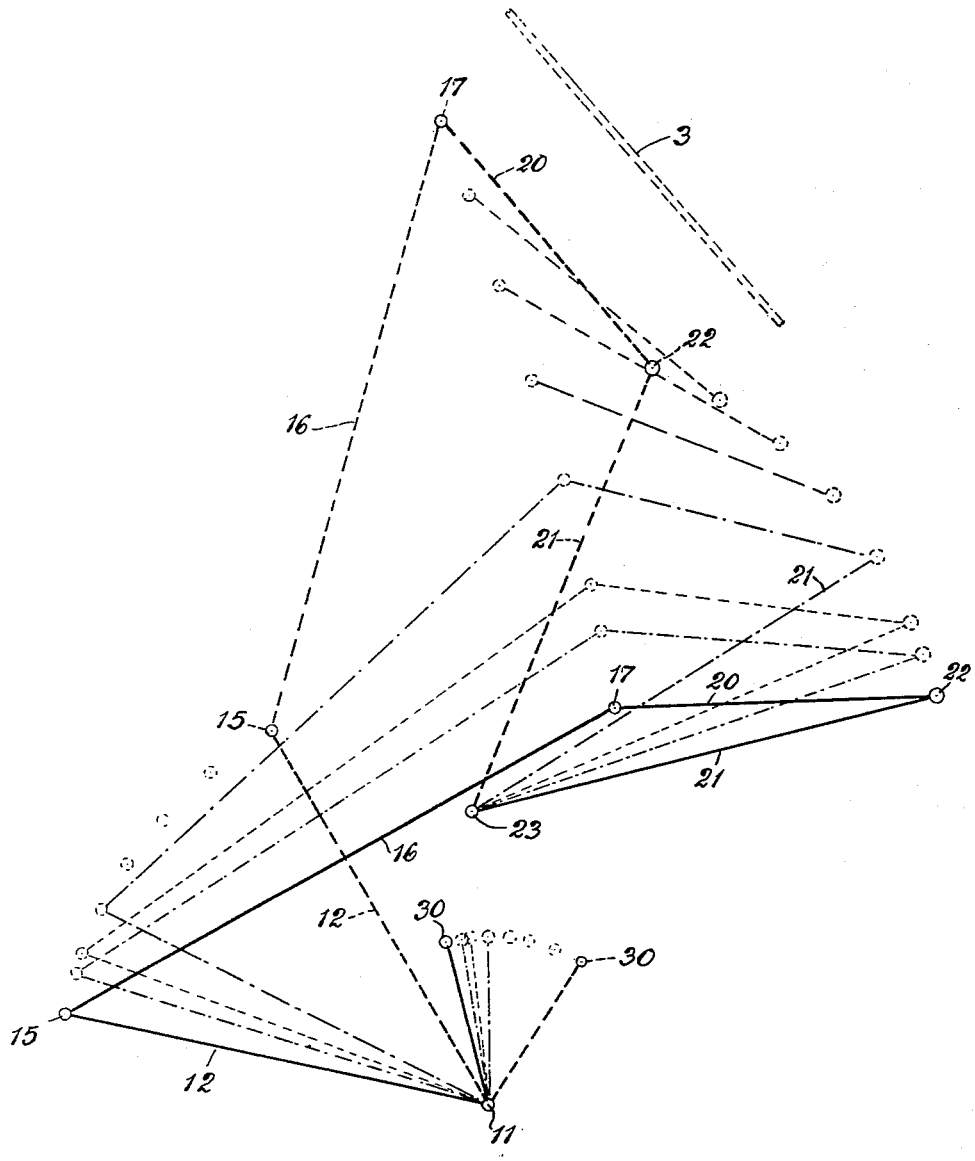
Figure 5 is a schematic showing of the movement of the hinge means illustrated in Figures 1–4.

Therefore, as is illustrated schematically in Figure 5, initial upper movement of the forward portion of the closure 3 is transmitted through the hinge structure of my invention to cause upward-forward movement of the rear portion of the bracket 20 and consequently of the rear edge of the closure 3.

A spring 35, when the closure 3 is in closed position, as illustrated in Figure 2, extends from the member 21 to the member 12 at one side of the pivot 23, and as the parts are shown in the drawings, below the pivot 23. As the hood closure 3 is raised however and the parts are moved toward the fully open position illustrated in Figure 3, the spring 35 is carried across the pivot 23 and, when the parts are in fully open position, the spring 35 is positioned on the opposite side of pivot 23. Thus the spring tension is effective to aid in retaining the hood closure in closed position, as illustrated in Figure 2. It will be understood that the hood, as is common practice, will be latched to the closure at the forward portions thereof. It is nonetheless important, in view of the vibration to which the members are subjected, that the rear portion of the hood be also retained in closed position. Similarly, various means have been provided in the past for retaining the closure in open position. The spring 35 is effective, in conjunction with the structure disclosed herein, to accomplish both of these objectives while at the same time permitting the operator to open and close the hood with minimum exertion and force and without the necessity for disconnecting or connecting separate locking elements which might otherwise be required for the rear edge of the hood closure 3.

Figure 7:
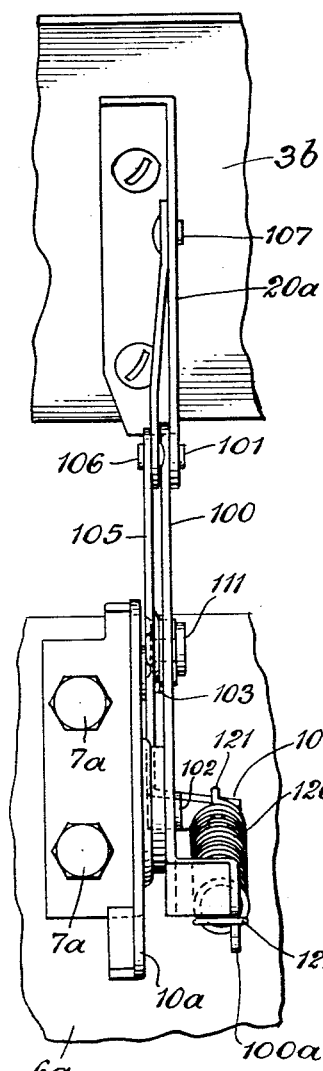
Figure 7 is a front view of the structure illustrated in Figure 6.
Figure 6:
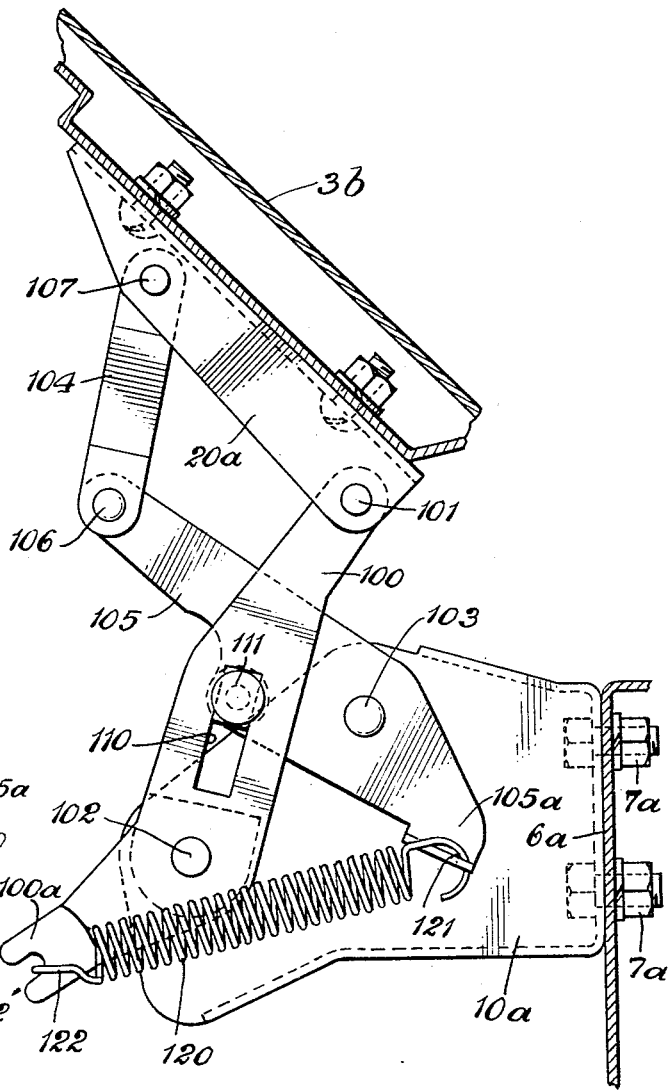
Figure 6 is a side elevation of a varying form of my invention.

Referring now to Figures 6 and 7, I illustrate a varying form of my invention in which the structure thereof is somewhat simplified over that illustrated in Figures 1–5 inclusive. For convenience those portions of the structure illustrated in Figures 6 and 7 which correspond to those elements described earlier are given the same number with a letter attached. Thus, for example, the numeral 6a designates an automobile fire-wall section. The numeral 10a indicates hinge support brackets secured thereto by securing means such as those shown as 7a. The hood closure 3b is secured to the closure supporting brackets 20a. A first armed member 100 is pivotally mounted at one end to a rear portion of the bracket 20a as at 101. The arm 100 is pivotally mounted to the top of a bracket 10a as at 102. A second arm member is pivotally mounted to the plate 10a at a point spaced from the pivot 102 as indicated at 103. A link or arm 104 is pivotally connected to the outer end of a second arm member 105 as at 106 and also to a portion on the bracket 20a, forwardly spaced from the pivot 101 as at 107. A slot 110 is formed in the arm 100 substantially intermediate the pivot points 101—102 and the arm 105 carries a pin 111 at a point intermediate its pivots 103—106, the pin 111 extending through the slot 110. As may be best seen in Figure 6, the arms 100—105 overlap throughout the excursion of the parts of the hinge structure illustrated therein, the pin reciprocating within the slot 110 and the opposite ends of the slot 110 serving as limits or stop means to the movement of the hinge of Figure 6. A spring 120 has its opposite ends secured to an end portion 105a of the lever arm 105 as at 121 and to end portion 100a of the lever 100 as at 122. It will be observed that the portions 105a, 100a extend beyond the pivots 103, 102, respectively. While not illustrated, it will be understood that the spring 120, as the hinge structure is closed and moved to the opposite end of its excursion from that illustrated in Figure 6, will move across the pivot point 102 as in the manner and for the purposes described with relation to the spring 35 previously described.

It will be realized that, whereas there has been described and illustrated a practical and operative device, nevertheless many changes can be made in the size, shape, number and disposition of parts without departing from the spirit of the invention. It is therefore desired that the description and drawings be taken as in a broad sense illustrative or diagrammatic rather than as limiting the scope of the invention, except as set forth in the pending claims. It will be understood, for example, that the angular relationship of the slot 27 in the member 25 may be varied and that by so doing the movement of the hinge and consequently of the member 3 may be varied to suit differing conditions and circumstances in relation to the hood 3 and its position with respect to the automobile.

The use and operation of the invention are as follows:

The closure for the hood of modern-day automobiles and similar structures, in order to create a pleasing appearance, has its rear edge positioned level with and close to adjacent portions of the automobile hood and cowl. When the closure is raised upwardly at its forward end, or tilted, the closure rear edge will be brought into contact with adjacent portions of the hood or cowl and may cause bending and distortion of the closure along its rear edge. The present invention therefore provides a hinge structure for such closures whereby initial upward movement of the forward edge of the closure is transmitted, through said hinge structure, to produce initial vertical movement of the closure rear edge as the hood is upwardly tilted. This initial vertical movement may itself be very slight, as to be not readily discernible to the naked eye. It will be understood that the vertical movement of the closure rear edge may in fact be simultaneous with the overall tilting of the closure, without departing from the nature and scope of my invention, and further, that the rear edge of the closure 3 may move forwardly, away from the cowl 2, as the front end of the closure is raised. Primarily, I provide a hinge structure effective to produce a tilting or pivoting of a hood closure about a moving fulcrum or pivot point, thus creating a simultaneous raising and tilting of the closure.

It will be understood that whereas, for convenience, a single hinge structure is illustrated in the drawings and set forth in the claim, the well-known practice of employing pairs of such hinge structures, positioned one beneath each of the rear corners of the closure, may be followed without departing from the nature and scope of my invention. Similarly, while an automobile hood and closure is illustrated, it will be realized that the invention is useable with a variety of closure members.

It is important to provide a hinge structure which shall nonetheless be effective to retain the closure rear edge in closed position even though the closure is subjected to substantial vibration and strain. The forward portions of the automobile closures, for example, may be latched securely together. The closure's rear edge, as shown in the drawings, when movably connected to the hood by the hinge structure of the present invention may be held in desired closed position by the spring 35. On the other hand, when the closure is raised to full open position, it is important to provide means for holding the closure in open position permitting access to the area within the automobile hood or other structure with which the closure is employed. By connecting and positioning the spring 35 as shown in the drawings and described herein, the spring 35 may be considered to perform the dual function of retaining the rear edge of the closure in desired closed position and of also retaining the closure in full open position. The spring 35 may be overcome with relative ease by the operator in view of the substantial leverage created by the length of the closure and the placement of the hinge structure adjacent the closure rear edge. It is a further function of yielding means 35 to take up a substantial portion, if not all, of the backlash existing when the hinge means is in closed position. It should be further noted that the arrangement of the slot 27 in the hinge structure of my invention is such as to provide an initial easy and swift upward movement of the hood 3 from its closed or lowermost position shown in Figure 2 with a gradual slowing down to the zero rate of lift indicated on the back end of the slot 27 as the hinge approaches the terminal position illustrated in Figure 3. The arrangement of parts is such, as may be best seen in Figure 2, as to produce a substantially immediate and rapid upward movement of the pivot point 22 on the arm 21 as the pin 30 moves in clockwise direction, as the parts are shown in Figure 2, in response to the lifting of the pivot point 17 transmitted through members 16, 12, 26. In other words, the initial opening of the hood produces a side motion of the block 28 against the wall of the slot 27 whereas the latter part of opening movement merely permits the slide or block 28 to move easily along the walls of the slot 27.

In Figure 6 I have illustrated a simplified structure employing only three arms or links or lever elements in the construction of my articulated hinge. In addition to simplification the structure of Figures 6 and 7 occupies a substantially reduced spacial area.

I claim:

In a hinge and support structure for automobile hood closures and the like, a mounting plate, a first arm pivotally mounted on said mounting plate at a point intermediate the ends of said arm, a second arm pivotally mounted on said plate at a point spaced from the pivot of said first arm and at a point intermediate the ends of said second arm, a slot in one of said arms, a pin fixed on the other of said arms and extending through said slot, a block member rotatably mounted on said pin and slidably mounted in said slot in slidable engagement with the sidewalls of said slot at all positions of said arms, said second arm being pivotally connected to said hood closure at one end thereof, a link member pivotally connected at opposite ends to one end of said first arm member and to said hood closure, and a spring connected at its opposite ends to said first and second arm members at their ends beyond the points at which said arms are pivotally mounted on said plate, said block member being movable into engagement with the opposite end walls of said slot in response to articulation of said arms to provide stop means limiting movement of said arms toward open and closed positions.

References Cited in the file of this patent

UNITED STATES PATENTS

| | | |
|---|---|---|
| 246,364 | Birkmann | Aug. 30, 1881 |
| 431,310 | Ashmore | July 1, 1890 |
| 683,887 | Bedell | Oct. 1, 1901 |
| 2,668,320 | Lustig | Feb. 9, 1954 |
| 2,683,280 | Martens | July 13, 1954 |

FOREIGN PATENTS

| | | |
|---|---|---|
| 863,303 | Germany | Jan. 15, 1953 |